3,828,098
SULFUR SUBSTITUTED BIS(POLYFLUORO-ALKOXYALKYL CARBOXYLIC ACIDS) AND DERIVATIVES THEREOF
Kenneth B. Gilleo, Buffalo, Edward S. Jones, Williamsville, and Edward G. Tajkowski, Amherst, N.Y., assignors to Allied Chemical Corporation, New York, N.Y.
No Drawing. Filed Oct. 2, 1972, Ser. No. 294,139
Int. Cl. C07c 149/12
U.S. Cl. 260—481 R         18 Claims

ABSTRACT OF THE DISCLOSURE

Dicarboxylic acids, their alkali metal salts and lower alkyl esters which contain two polyfluoroalkoxyalkyl carboxy moieties joined by a —S— or a —S—alkylene—S— crosslink. These compounds are useful as surfactants, as water repellent agents, as corrosion resistant agents and dropwise condensation promoters.

BACKGROUND OF THE INVENTION

This invention relates to novel fluorocarbon carboxylic acids and more particularly to polyfluoroaliphatic dicarboxylic acids which contain two polyfluoroisoalkoxyalkyl carboxylic acid moieties connected to a —S— or —S— alkylene—S—crosslink and further relates to the alkali metal salt and lower alkyl esters thereof.

It is known that fluorocarbon monocarboxylic acids and certain of their derivatives such as their alkali metal salts effectively lower the surface tension of polar liquids such as water. It is also known that fluorocarbon monocarboxylic acid compounds are valuable oil and water repellent agents by virtue of the presence of a reactive group at one end of the molecule and the presence of a fluorocarbo "tail" having a low surface energy at the other end thereof. When the reactive carboxyl groups of these acids are absorbed on or bonded to a solid surface, the fluorocarbon "tail" having a low surface energy at the other rier having no affinity for either oil or water. We have found a novel class of divalent sulfur substituted fluorocarbon dicarboxylic acids which have perfluorinated terminal branched chain or cyclic alkoxy groups linked through an ether oxygen to a —CF$_2$— group which are oil and water repellent agents of unusual activity and which promote dropwise condensation on metallic surfaces.

One object of the present invention is the provision of a novel class of sulfur substituted fluorocarbon dicarboxylic acids.

Another object of the invention is the provision of novel derivatives of these novel sulfur substituted dicarboxylic acids.

A further object is the provision of novel divalent sulfur substituted fluorocarbon dicarboxylic acids and derivatives thereof, having surfactant and oil and water repellent properties.

A still further object is the provision of novel divalent sulfur substituted fluorocarbon dicarboxylic acids which will promote dropwise condensation on metallic surfaces thus improving heat transfer from the metallic surface.

These and other objects and advantages will be apparent from the following description of our invention.

SUMMARY OF THE INVENTION

The novel fluorocarbon compounds of the present invention are represented by the general formula (I)

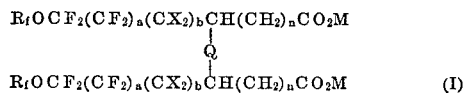

wherein
(i) R$_f$ is each independently at each occurrence a polyfluoroalkyl and is generally a polyfluoroisoalkyl radical of 3 through 7 carbon atoms which may be linear or branched and completely or partially fluorinated, and is preferably a perfluoroisoalkyl radical of the formula:

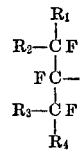

wherein R$_1$, R$_2$, R$_3$ and R$_4$ independently at each occurrence can be F or perfluoro lower alkyl groups, or one of R$_1$ and R$_2$ and one of R$_3$ and R$_4$ taken together can form a cyclic perfluoroalkylene group, with the proviso that no more than two of the four R$_1$–R$_4$ groups are perfluoro lower alkyl groups.

(ii) Q is —S(C$_z$H$_{2z}$C—)$_t$ wherein z is an integer 2 to 6 and t is 0 to 1.

(iii) X is independently at each occurrence H or F.

(iv) a and b are independently at each occurrence zero or an integer 1 to 20.

(v) n is independently at each occurrence zero or an integer 1 to 20.

(vi) M is independently at each occurrence H, an alkali metal cation, or a lower alkyl group.

Independently means the radicals or groups may be identical or different.

The critical structural features of the present novel compounds are the structure of the two fluoroisoalkoxyalkyl moieties, the presence of the two carboxylic acid groups or groups derived therefrom and the presence of the divalent sulfur-containing linkage connecting the two fluoroisoalkoxyalkyl carboxyl moieties. Each of the fluoroisoalkoxyalkyl moieties of the present compounds is characterized by the presence of an oxygen atom simultaneously linked to (a) a carbon atom linked to a fluorine atom as well as to two perfluoroalkyl groups, and (b) a —CF$_2$— group. The perfluoroalkyl groups are characterized by the presence of at least one fluorine atom on each carbon atom adjacent to the carbon atom linked to the oxygen atom. These perfluoroalkyl groups may, when taken together, form a cycloaliphatic structure. The presence of the divalent sulfur-containing crosslink and of the two carboxylic acid or carboxylic acid-derived groups in the present novel molecules provide the reactive sites referred to above for bonding, such as by absorption, of the present compounds to a substrate such as a metal or nylon. The sulfur substituted bis(polyfluoroisoalkoxyalkyl carboxylic acids) are useful as lubricant additives for oils to reduce friction, as oil and water repellents for nylon and as corrosion resistant coatings for metals such as aluminum, copper, magnesium and iron alloys.

DETAILED DESCRIPTION OF THE PREFERRED EMBODIMENTS

The present novel sulfur containing compounds of the invention are conveniently prepared by reaction of a monobromo or monoiodo polyfluoroisoalkoxyalkyl monocarboxylic acid with an alkali metal sulfide A$_2$S(C$_z$H$_{2z}$S)$_t$ wherein A is an alkali metal cation and z and t have the aforementioned meanings.

The latter reagent represents, when t=0, an alkali metal sulfide such as Na$_2$S or K$_2$S and represents, when t=1, an alkali metal salt of an alkane dithiol such as 1,2-ethane dithiol; 1,2-propane dithiol; 1,3-propane dithiol; 2-methyl propane 1,3-dithiol; 1,6-hexane dithiol; and the like. The foregoing reaction is illustrated by Reaction I below:

Compound I $$R_fOCF_2(CF_2)_a(CX_2)_b\overset{Hal}{\underset{|}{C}H}(CH_2)_nCO_2M +$$

Compound II            Compound III $$R_fOCF_2(CF_2)_a(CX_2)_b\overset{Hal}{\underset{|}{C}H}(CH_2)_nCO_2M + A_2S(C_cH_{2c}S)_t \longrightarrow$$

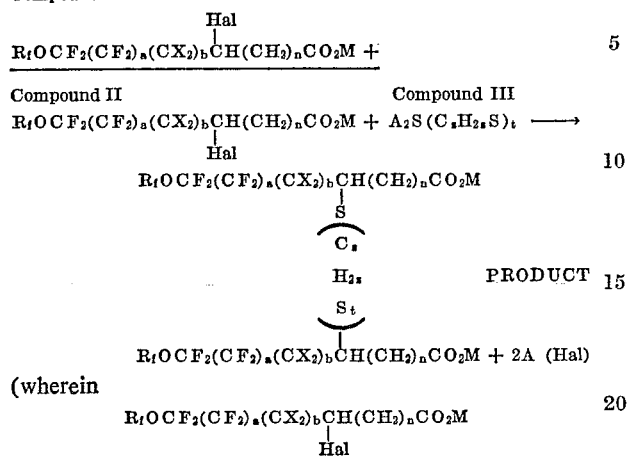

$$R_fOCF_2(CF_2)_a(CX_2)_b\overset{}{\underset{|}{C}H}(CH_2)_nCO_2M + 2A \text{ (Hal)}$$

(wherein $$R_fOCF_2(CF_2)_a(CX_2)_b\overset{}{\underset{Hal}{C}H}(CH_2)_nCO_2M$$

may be the same or different at each occurrence. Hal is bromine or iodine and $R_f$, A, b, X, n and M have the previously assigned meanings.) Reaction I is effected according to a condensation which will be further illustrated by examples.

It is frequently advantageous for M in compounds I and II respectively to be a group other than hydrogen and, for purposes of acting as an intermediate for preparation of the hydrogen containing product, may be an alkyl group, such as methyl, ethyl, propyl, pentyl or hexyl. The utilization of an alkyl group in the M position in compounds I and II permits better product yields since there are no carboxyl hydrogens to enter into the reaction. It is to be understood, however, that the reactions will proceed when compounds I and II contain unsubstituted carboxyl hydrogen in the M position with somewhat lower yields. When M is an alkyl group, the resulting product is a diester rather than a dicarboxylic acid. The diester is then an intermediate in the formation of the corresponding dicarboxylic acid. The following reactions concerning the preparation of the necessary intermediates to form the product of the invention are illustrated using compounds wherein M is hydrogen. It is to be understood, however, that the following reactions will proceed even though M is an alkyl group or other group which has been substituted for the carboxylic hydrogens, such as an alkali metal cation selected from Li+, Na+, K+, Cs+, Ca++, Zn++ and Mg++.

A method for obtaining halogenated Compounds I and II where n is greater than zero and b is 1 is by reacting the intermediate A $R_fOCF_2(CF_2)_a$-I (or Br) with $$CH_2=CH(CH_2)_nCOOH$$

to yield $$R_fOCF_2(CF_2)_a\underset{\underset{I \text{ (Br)}}{|}}{CH_2CH}(CH_2)_nCOOH \quad \text{COMPOUND I or II}$$

The intermediate A $R_fOCF_2(CF_2)_a$-I (Br) may be prepared by reacting $R_fOCF_2I$ (Br) with a/2 moles of $$CF_2=CF_2$$

where a is even. $R_fOCF_2(CF_2)_a$-I may be prepared by reacting $R_fOCF_2CF_2CF_2I$ (Br) with a/2 moles of $$CF_2=CF_2$$

where a is odd.

Compounds I and II where n is zero may be obtained by reacting the intermediate B $$R_fOCF_2(CF_2)_a(C[X \text{ or } Y]_2)_bCH_2COOH$$

with P $Br_3$ to yield $$R_fOCF_2(CF_2)_a(C[X \text{ or } Y]_2)_b\overset{Br}{\underset{|}{C}H}COOH \quad \text{COMPOUND I or II}$$

Intermediate B of the type terminating in $$\text{-(CF}_2)_bCH_2COOH$$

may be prepared by reacting intermediate A $$R_fOCF_2(CF_2)_aI$$

(or Br) with $CF_2=CF_2$ to obtain product in which X is F terminating in -(CF_2) I (or Br) and react one mole product of the latter with one molar proportion of $CH_2=CF_2$ to get -(CF_2)_bCH_2CF_2I (or Br). -(CF_2)_bCH_2CF_2I (or Br) is then reacted at 50 to 175° C. with $SO_3$ to form $$\text{-(CF}_2)_bCH_2CFO$$

which is hydrolized to intermediate B having the formula $R_fOCF_2(CF_2)_a(CF_2)_bCH_2COOH$.

To make starting material B terminated in $$\text{-(CH}_2)_bCH_2COOH$$

wherein b is *odd*, condense $R_fOCF_2(CF_2)_aI$ (Br), i.e. starting material A with b+1/2 molar proportion of $CH_2=CH_2$ to yield -(CH_2)_bCH_2I (or Br), then react latter with $Mg/CO_2/H_2O$ according to the Grignard carboxylation technique to obtain the corresponding product terminating in -(CH_2)_{bodd}—CH_2COOH.

To make starting material B terminating in $$\text{-(CH}_2)_bCH_2COOH$$

where b is even, react A, i.e. $R_fOCF_2(CF_2)_bI$ (or Br) with b/2 molar proportions of $CH_2=CH_2$ to obtain product terminating in -(CH_2)_bI (or Br). React latter with one molar proportion of $CH_2=CF_2$ to obtain product terminating in -(CH_2)_{beven}CH_2CF_2I (or Br). React latter with $SO_3$ to obtain product terminating in $(CH_2)_bCH_2CFO$ and hydrolize the latter to obtain starting material "B," i.e. -(CH_2)_bCH_2COOH.

The reaction intermediates used for forming a product of the invention may be further modified in accordance with known processes to obtain varying reaction products. For example, the chain length may be increased in the polyfluoroisoalkoxyalkyl carboxylic acid through the above Grignard carboxylation technique. The reaction equation is:

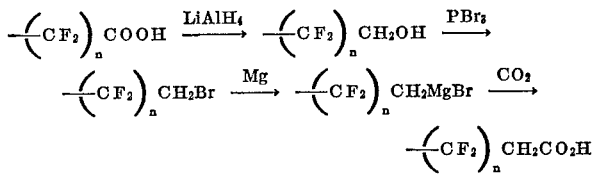

Similarly, the chain lengths may be shortened by known reactions.

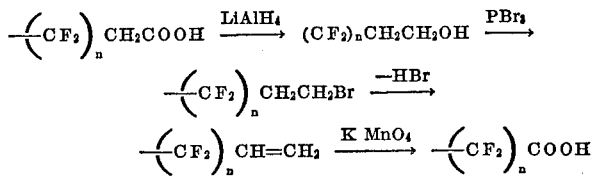

A further discussion of preparation of starting materials from known compounds may be found in U.S.P. 3,514,487 to Anello et al., issued May 26, 1970, which patent is incorporated herein by reference.

Compounds of the invention which can be prepared from the foregoing process include, but are not limited to the following:

(1)
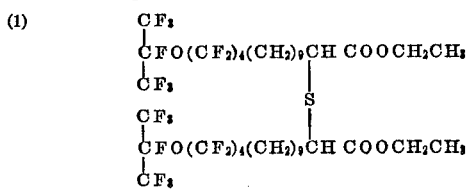

(2) 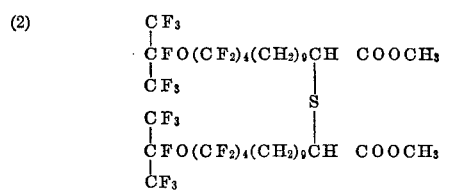
(3) 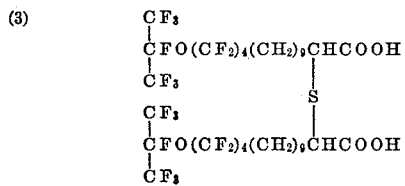
(4) 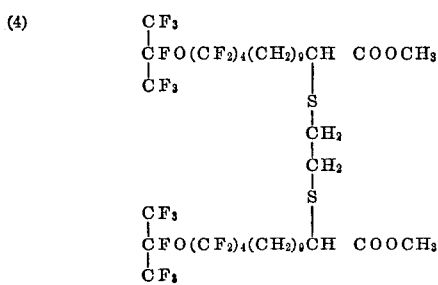
(5) 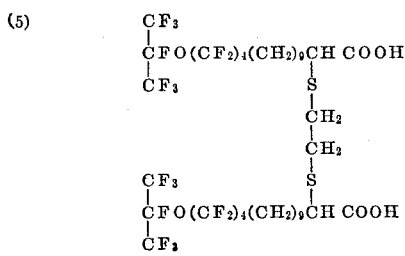
(6) 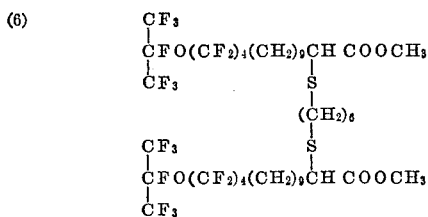
(7) 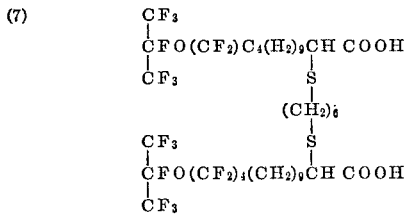
(8) 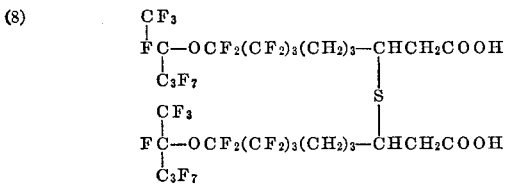
(9) 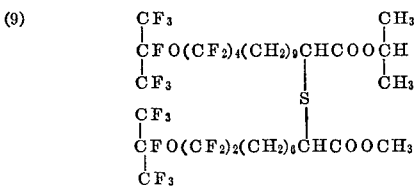
(10) 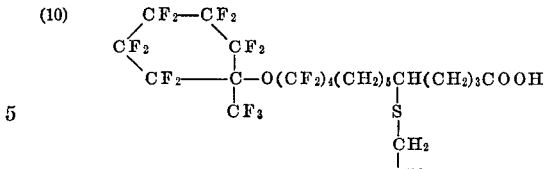
(11) 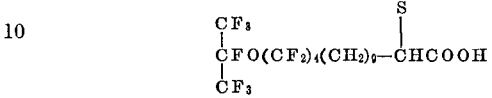
(12) 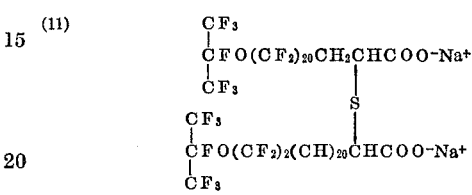
(13) 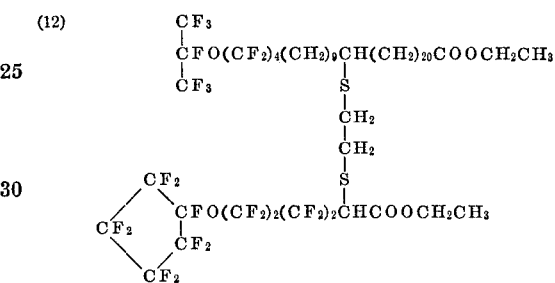
(14) 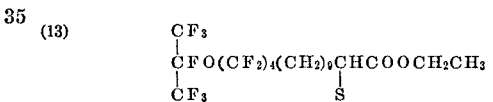
(15) 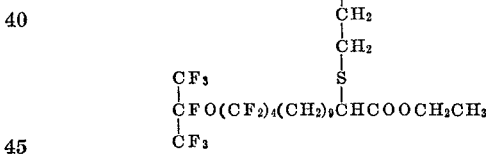
(16) 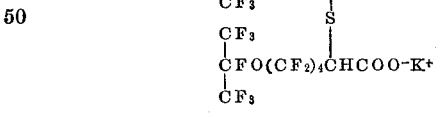
(17) 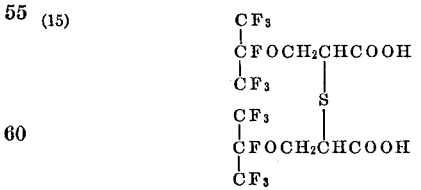
(18) 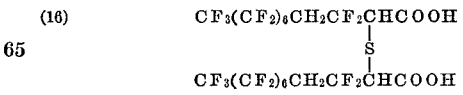
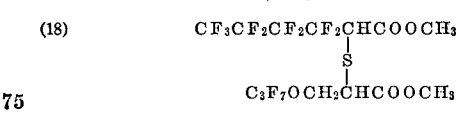

(19)  (CF₃)₂CFO(CF₂)₂(CH₂)₉CHCOOH
                                |
                                S
                                |
      (CF₃)₂CFO(CF₂)₂(CH₂)₉CHCOOH

The following examples are for illustration but not limitation of methods for preparation of the compounds of the invention.

EXAMPLE 1

A mixture of 285 g. (0.500 mole) of $$C_3F_7O(CF_2)_4(CH_2)_{10}COOH$$

(crude) and 0.5 g. red phosphorous is heated to 80° C. Then 80 g. of bromine (dried with sulfuric acid) is added, a small amount at a time. Total addition time is two hours. The mixture is stirred at 80–85° for 72 hours.

Excess Br₂ is purged with nitrogen.

Infrared analysis is consistent with the structure

```
       CF₃
        |
       CFO(CF₂)₄(CH₂)₉CHBrCOOH
        |
       CF₃
```

EXAMPLE 2

The product prepared in Example 1, $$C_3F_7O(CF_2)_4(CH_2)_9$$

is mixed with 750 ml. benzene and 750 ml. methanol with 1 ml. conc. H₂SO₄ as a catalyst.

The mixture is heated and refluxed for 20 hours. Solvent is removed giving a brown liquid. The product is distilled (.23 mm. @126.0–126.5°) in a spinning band column to give a 99% pure product weighing 156 g.

The resulting composition has the structure

```
       CF₃
        |
       CFO(CF₂)₄(CH₂)₉CHBrCOOCH₃
        |
       CF₃
``` confirmed by infrared analysis.

EXAMPLE 3

A mixture of 13.3 g. (.0275 mole) of

```
       CF₃
        |
       CFOCF₂CF₂(CH₂)₁₀COOH
        |
       CF₃
``` and 1.2 g. of acetic anhydride is heated to 60°. Then, 5 g. of dried bromine (distilled) is added with stirring.

After evaporation of HBr is no longer detected, 35 g. of dry bromine is added. The mixture is then heated for 20 hours at 70°. The temperature is then raised to 100° for two hours.

Bromine is distilled off to give an amber liquid.

Esterification is accomplished by refluxing the liquid with 100 ml. ethanol for three hours. The solution is cooled and 200 ml. water is added causing the product to settle out as a yellow liquid weighing 38 g. after drying under vacuum.

The compound is believed to have the structure

```
       CF₃
        |
       CFOCF₂CF₂(CH₂)₉CHCOOC₂H₅
        |                |
       CF₃              Br
``` as indicated by infrared analysis.

EXAMPLE 4

A solution of 32.6 g. (.05 mole) of

```
       CF₃
        |
       CFO(CF₂)₄(CH₂)₉CHBrCOOCH₃
        |
       CF₃
``` in 10 ml. ethanol is maintained at about 40°.

A solution of 6.0 g. (0.25 mole) of Na₂S·9H₂O in 30 ml. ethanol and 2 ml. water is added with stirring over a 30 minute interval.

After the addition, the mixture is stirred at 40° for 30 minutes. An additional 0.5 g. of Na₂S·9H₂O is added and then temperature is brought to 65–70° for one hour.

The mixture is cooled and 10 ml. ether is added causing a white precipitate. The solid is filtered and excess solvent evaporated off. An additional 10 ml. ether is added causing further precipitation. Solid and solvent are again removed giving a yellow liquid weighing 30 g. The liquid is kept under vacuum overnight to give 27.9 g. clear product for a 95% conversion. The product is thought to be pure $$\left[ \begin{array}{c} CF_3 \\ | \\ CFO(CF_2)_4(CH_2)_9CHCOOCH_3 \\ | \\ CF_3 \quad\quad \frac{1}{2}\,S \end{array} \right]_2$$

as indicated by infrared analysis.

EXAMPLE 5

The procedure of Example 6 is followed except .05 mole of

```
    (CF₃)₂CFOCF₂CF₂(CH₂)₉CHCOOCH₂CH₅
                                |
                                Br
``` is used. Infrared analysis indicates that the resulting compound is $$\left[ (CF_3)_2CFOCF_2CF_2(CH_2)_9CHCOOCH_2CH_5 \right]_2$$
$$\phantom{xxxxxxxxxxxxxxxxxxxxx} \tfrac{1}{2}\,S$$

EXAMPLE 6

A sample of material prepared in Example 4 presumed to be the α-brominated ester, previously described is used in this experiment.

This material is found to have a retention time of 300 seconds on a ¼″ x 5″ SE–30 column at 200°. The non-brominated ester has a retention time of 280 seconds under the same conditions.

The bromoester is reduced as follows:

A mixture of 0.58 g. bromoester, 0.25 ml. benzene, 0.25 ml. ether and .06 g. copper-zinc couple is heated for one hour.

Analysis by gas chromatography under the same conditions as previously described gives a retention time for the product of 280 seconds. Thus, the product is the original starting material which demonstrates that the bromo compound is the α-bromoester.

EXAMPLE 7

A mixture of 4.8 g. (4 moles) of

```
       CF₃
        |
       CFO(CF₂)₄(CH₂)₉CHCOOCH₃
        |                |
       CF₃              S
                        |
       CF₃              |
        |               |
       CFO(CF₂)₄(CH₂)₉CHCOOCH₃,
        |
       CF₃
```

30 ml. of 10% NaOH and 20 ml. ethanol is heated at reflux for two hours. The mixture is cooled and acidified with 5% HCl. A white, waxy solid forms. The dry product weighs 4.3 g. Infrared analysis shows complete conversion to the acid

```
       CF₃
        |
       CFO(CF₂)₄(CF₂)₉CHCOOH
        |                |
       CF₃              S
                        |
       CF₃              |
        |               |
       CFO(CF₂)₄(CH₂)₉CHCOOH·
        |
       CF₃
```

EXAMPLE 8

A mixture of 4.0 g. of the sodium salt of the sulfur dimer acid prepared in Example 6, 20 ml. glacial acetic acid and 1 ml. conc. HCl is stirred at 80–85° for two hours. The mixture is cooled and 5 ml. water is added causing a white solid to precipitate. The product is dried under vacuum giving a white, slightly waxy solid weighing 1.5 g. which is believed to be the acetate ester as indicated by infrared analysis.

The filtrate is extracted with ether. Concentration of the ether solution under vacuum gives a white powder, m.p. 83–91°. The infrared shows a carbonyl peak at 1720 cm.$^{-1}$. Product weighs 1.7 g.

EXAMPLE 9

Preparation of

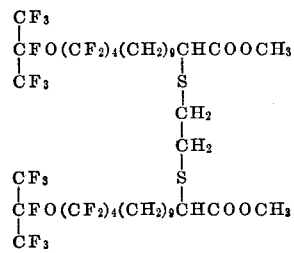

To 25 ml. ethanol is added 0.46 g. (20 moles) sodium metal. After the metal has dissolved, 0.94 g. (10 moles) HSCH$_2$CH$_2$SH is added.

After five minutes, 13.04 g. (20 moles) of

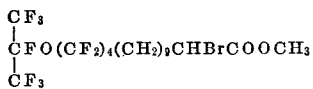

is added all at once. A white precipitate (NaBr) formed.

The mixture is heated at 60° for one hour, cooled, and filtered. The filtrate was concentrated on a rotary evaporator. Ether is added to the concentrate causing additional precipitation which is filtered. The product bridged sulfur dimer is obtained as a viscous amber liquid weighing 12.0 g. (98.5%). The sulfur bridged ethyl ester is similarly prepared using $$C_3F_7O(CF_2)_4(CH_2)_9CHBrCOOCH_2CH_3.$$

EXAMPLE 10

Preparation of

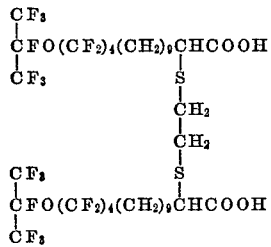

A mixture of 6.3 g. (5 moles) of the methyl ester of the dimer acid, 30 ml. 10% NaOH and 20 ml. ethanol is heated under reflux for three hours. The mixture is acidified causing a semi-solid to precipitate. The semi-solid is dissolved in 40 ml. acetic acid containing 1 ml. HCl. The mixture is heated at 80° for one hour. The cooled mixture is extracted with ether. Evaporation of the ether gives a tan solid weighing 5.4 g. (85%) with m.p. 67–73°. Infrared indicated an acid. Solubility: V.S. in ether, acetone, ethanol; insoluble in water.

EXAMPLE 11

Preparation of

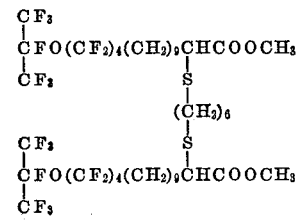

A solution of sodium ethoxide is prepared by dissolving 0.23 g. (10 moles) of sodium metal in 5 ml. absolute ethanol. Then, 0.75 g. (5 moles) 1,6-dithio hexane is added.

Finally, 6.6 g. (10 moles) of

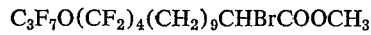

is added. This mixture is heated at reflux for one hour and then cooled whereupon a white solid (NaBr) settles out. The mixture is acidified with 5% HCl and then is extracted with ether. Evaporation of the ether gives a viscous, clear liquid. Infrared analysis shows a carbonyl at 1740 cm.$^{-1}$. Weight of product is 3.1 g.

The corresponding bridged ethyl ester is similarly prepared using

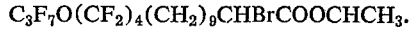

EXAMPLE 12

Preparation of

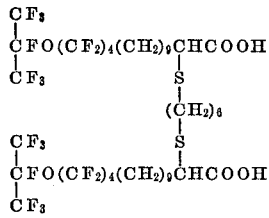

Sodium ethoxide is prepared by adding 0.23 g. (1 mole) sodium to 5 ml. absolute ethanol. To this mixture is then added .075 g. (0.5 moles) of 1,6-dithiol hexane. Finally, 0.66 g. (1 mole) of

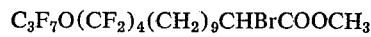

is added. The mixture is heated at reflux for one hour. On cooling, a white solid settles out. The product appears to be the sodium salt of the sulfur dimer.

The product is hydrolyzed with acetic acid containing 5% hydrochloric acid. A yellow sticky material forms. The product appears to be the sulfur dimer acid as indicated by infrared analysis.

EXAMPLE 13

Preparation of

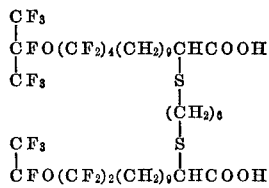

Sodium ethoxide is prepared by adding 0.23 grams (1 mole) sodium to 6 ml. absolute alcohol. To this mixture is then added .075 g. (0.5 moles) of 1,6-dithiol-hexane. Finally ½ mole of

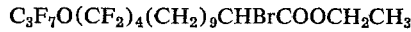

and ½ mole of

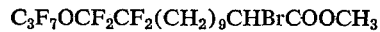

is added. The mixture is heated at reflux for one hour. On cooling, a white solid settles out. The product appears to be a mixture of sulfur dimers. Preparative gas chromatography is used to separate the mixture into three distinct fractions indicating compounds having three different molecular weights. The compound having the median molecular weight was hydrolyzed with acetic acid containing 5% HCl forming a free acid as indicated by infrared spectroscopy and by products of both methanol and ethanol indicating that the original sulfur dimer diester included both

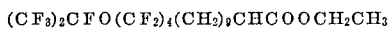

and

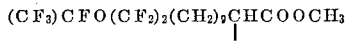

groups.

The fluorinated sulfur dimer acids of the invention may be applied to textile fabrics such as silk, nylon, wool and acrylics by any suitable means known in the prior art, such as by spraying or brushing the fabric with a solution of the fluorinated sulfur dimer acid or by dipping the fabric in a solution of the fluorinated dimer acid. Any suitable solvent such as an organic solvent of an aldehyde, ketone or alcohol or an inorganic solvent, such as a mixture of isopropanol and water are particularly suitable. Any suitable concentration of the fluorinated sulfur dimer acid in solution may be used although weight concentrations of from about 0.05% to about 15% have been found to be preferred.

When the fluorinated dimer acid is applied to such textile fabrics, water and oil repellency is found to be imparted to the fabric.

Solutions of the fluorinated sulfur dimer acids may be similarly applied to other surfaces, such as surfaces made of ceramics or metals to impart water repellency and corrosion resistance to the surface, and to create a dropwise condensation promoting surface, which will cause the formation of discrete drops of condensation when the surface is exposed to a vapor, such as steam, provided, of course, that the temperature of the surface is below the condensation temperature of the vapor. After spraying, brushing or dipping, the surface of the fabric ceramic or metal is dried to remove the solvent.

The following examples illustrate the utility of the fluorinated sulfur dimer acids of the invention as water repellents for fabric, as dropwise condensation promoters and as corrosion resistant coatings.

EXAMPLE 14

Ten percent by weight of the compound prepared in Example 12 is dissolved in a 50:50 water-ethanol system to form a solution. A sample of a nylon 6.6 fabric having a 60 warp of 265 denier thread and a 56 fill of 177 denier thread is treated by dipping in the above solution at room temperature for one minute. The treated fabric is then pressed between blotters and dried for five minutes at 149° C. The resulting fabric is held at a 45° angle and drops of water are projected onto the fabric. The water beads up and rolls from the fabric. When drops of water are projected onto the untreated fabric held at a 45° angle, the water does not bead and rapidly wets the fabric.

EXAMPLE 15

An aluminum tube is coated with a chromate conversion coating applied from an aqueous acidic solution consisting essentially of about 4 g./l. of chromic acid (CrO₃), 2.8 g./l. sodium fluoride and 10 g./l. monosodium acid phosphate. The tube is rinsed and dried and coated with a 0.1% by weight aqueous solution of

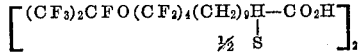

The resulting coated aluminum tube promotes dropwise condensation when contacted with steam as determined by visual observation of discrete beaded water on the tube surface.

EXAMPLE 16

A copper tube is treated with a 10% NaOH aqueous cleaning solution and is rinsed with distilled water. The tube is then dried and immersed for one minute in an aqueous acidic solution of 4.0 g./l. CrO₃, 2.8 g./l. NaF, 10 g./l. NaH₂PO₄·H₂ and sufficient HNO₃ to lower the pH to 1.8. The tube is then washed with distilled water, dried and immersed in a fluorotreating solution of 0.1%

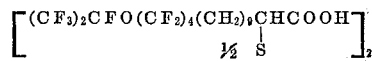

in a 50%/50% by weight IPA/H₂O solvent for two minutes at 60° C. the tube is again washed in distilled water and dried.

The resulting coated copper tube promotes dropwise condensation when contacted with steam as determined by visual observation of the formation of discrete beads of water.

EXAMPLE 17

The procedure of Example 16 is followed except a 0.1% solution of

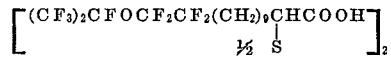

in the IPA/H₂O solvent is used as the fluorotreating solution. The resulting tube similarly shows dropwise condensation when contacted with steam.

EXAMPLE 18

The procedure of Example 16 is followed except a one-inch square of copper is used in place of the copper tube. The copper square is treated by placing a drop of 0.1% aqueous potassium sulfide on its surface. After a period of about 20 minutes a black copper sulfide tarnish begins to appear.

EXAMPLE 19

The procedure of Example 18 is followed except treatment with the aqueous acidic solution is eliminated. A black tarnish begins to appear in about one minute after treatment with the potassium sulfide solution.

EXAMPLE 20

The procedure of Example 18 is followed except treatment with the fluorotreating solution is eliminated. A black tarnish begins to appear in about one minute after treatment with the potassium sulfide solution.

EXAMPLE 21

The procedure of Example 16 is followed except 0.1% by weight of

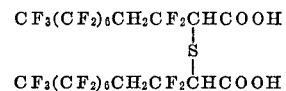

is used as the only fluorochemical in the fluorotreating solution. The resulting tube is visually observed to promote the formation of discrete beads of water on the tube surface when the surface is contacted with steam.

EXAMPLE 22

The procedure of Example 16 is followed except an aqueous solution of 1% by weight of compound (11) Col. No. 11 of this specification and 0.1% by weight of HCl is used as the fluorotraating solution. After drying and rinsing with distilled water formation of discrete drops of water is observed when the copper tube is exposed to steam.

EXAMPLE 23

The procedure of Example 22 is followed except compound (14) Col. No. 12 is used in place of compound (11). Formation of discrete water droplets is again observed when the tube is exposed to steam.

EXAMPLE 24

The procedure of Example 14 is followed except 2% by weight of compound (7) Col. No. 11 is used. When drops of water are projected onto the fabric the water beads up and rolls from the fabric.

EXAMPLE 25

The procedure of Example 14 is followed except 2% by weight of compound (10) Col. No. 11 of this specification is used. Again when drops of water are projected onto the fabric the water beads up and rolls from the fabric.

We claim:

1. A compound of the $$R_fOCF_2(CF_2)_a(CX_2)_bCH(CH_2)_nCO_2M$$
$$\phantom{R_fOCF_2(CF_2)_a(CX_2)_b}|$$
$$\phantom{R_fOCF_2(CF_2)_a(CX_2)_bCH(CH_2)_nCO}Q$$
$$R_fOCF_2(CF_2)_a(CX_2)_bCH(CH_2)_nCO_2M$$

wherein
(i) $R_f$ is independently at each occurrence a polyfluoroalkyl radical of 3 through 7 carbon atoms,
(ii) Q is $-S(C_zH_{2z}S-)_t$ wherein $z$ is an integer from 2 to 6 and $t$ is 0 to 1,
(iii) X is independently at each occurrence H or F,
(iv) $a$ and $b$ are independently at each occurrence zero or an integer 1 to 20,
(v) $n$ is independently at each occurrence zero or an integer 1 to 20, and
(vi) M is independently at each occurrence H, an alkali metal cation or a lower alkyl group.

2. The compound of claim 1 wherein $R_f$ is independently at each occurrence a polyfluoroisoalkyl radical.
3. The compound of claim 1 wherein Q is ⁅S⁆.
4. The compound of claim 1 wherein Q is ⁅SCH₂CH₂S⁆.
5. The compound of claim 1 wherein Q is ⁅S(CH₂)₆S⁆.

6. The compound of claim 1 wherein $R_f$ is

7. The compound of claim 1 wherein M is H.
8. The compound of claim 1 wherein M is —CH₃.
9. The compound of claim 1 wherein M is —CH₂CH₃.

10. A compound according to claim 1 of the formula

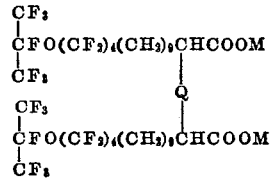

wherein Q is ⁅S⁆ or ⁅SCH₂CH₂S⁆ and M is independently at each occurrence selected from —H, —CH₃, or

—CH₂CH₃.

11. A compound according to claim 10 of the formula

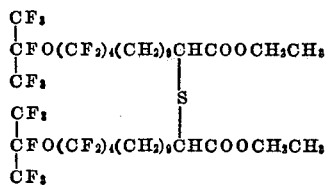

12. A compound according to claim 10 of the formula

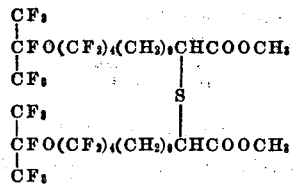

13. A compound according to claim 10 of the formula

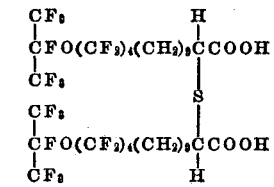

14. A compound according to claim 10 of the formula

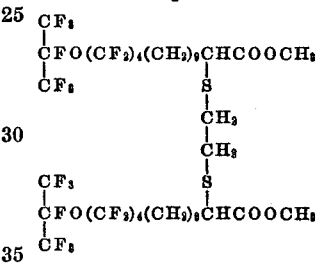

15. A compound according to claim 10 of the formula

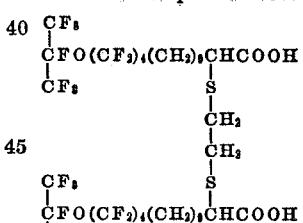

16. A compound according to claim 1 of the formula

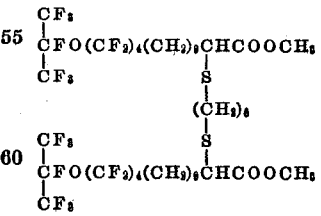

17. A compound according to claim 1 of the formula

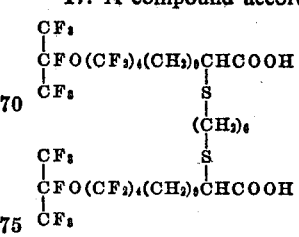

18. A compound according to claim 1 of the formula $(CF_3)_2CFO(CF_2)_2(CH_2)_3CHCOOH$
                             |
                             S
                             |
$(CF_3)_2CFO(CF_2)_2(CF_2)_3CHCOOH$

References Cited

UNITED STATES PATENTS

| | | | |
|---|---|---|---|
| 2,713,593 | 7/1955 | Brice et al. | 260—535 H |
| 3,172,910 | 3/1965 | Brice | 260—535 H |
| 3,409,647 | 11/1968 | Pittman et al. | 260—535 H |
| 3,471,518 | 10/1969 | Hager | 260—481 R |
| 3,514,487 | 5/1970 | Anello et al. | 260—535 H |
| 3,522,293 | 7/1970 | Harris | 260—481 R |
| 3,577,465 | 5/1971 | Anello et al. | 260—535 H |
| 3,641,083 | 2/1972 | Anello et al. | 260—535 H |
| 3,678,068 | 7/1972 | Anello et al. | 260—535 H |
| 3,697,564 | 10/1972 | Anello et al. | 260—535 H |
| 3,706,773 | 12/1972 | Anello et al. | 260—535 H |

LORRAINE A. WEINBERGER, Primary Examiner

J. F. TERAPANE, Assistant Examiner

U.S. Cl. X.R.

117—135.8, 138.8; 252—54.6, 352; 260—413, 526 N, 535 H, 614 F

UNITED STATES PATENT OFFICE
CERTIFICATE OF CORRECTION

Patent No. 3,828,098          Dated August 6, 1974

Inventor(s) KENNETH B. GILLEO, EDWARD S. JONES & EDWARD G. TAJKOWSKI

It is certified that error appears in the above-identified patent and that said Letters Patent are hereby corrected as shown below:

Col. 1, line 40 - "having a low surface energy at the other" should read
-- protrudes to form a fluorocarbon bar- --;

Col. 2, line 23 - "$-S(C_zH_{2z}C-)_t$" should read -- $-S(C_zH_{2z}S-)_t$ --;

Col. 4, line 19 - "b+1/2" should read -- $\frac{b+1}{2}$ --;

Col. 4, line 23 - "$(CH_2)_{bodd}-CH_2COOH.$" should read
-- $(CH_2)_b\atop odd$ $-CH_2COOH.$ --;

Col. 4, line 33 - " "B," " should read -- "B", --;

Col. 5, formula (7) - that part which reads
"$CFO(CF_2)C_4(H_2)_9$" should read
-- $CFO(CF_2)_4(CH_2)_9$ --;

Col. 7, line 25 - "$C_3F_7O(CF_2)_4(CH_2)_9$" should read
-- $C_3F_7O(CF_2)_4(CH_2)_9CHBrCOOH$ --;

Page 2.

UNITED STATES PATENT OFFICE
CERTIFICATE OF CORRECTION

Patent No. 3,828,098      Dated August 6, 1974

Inventor(s) KENNETH B. GILLEO ET AL

It is certified that error appears in the above-identified patent and that said Letters Patent are hereby corrected as shown below:

Col. 8, 1st formula –

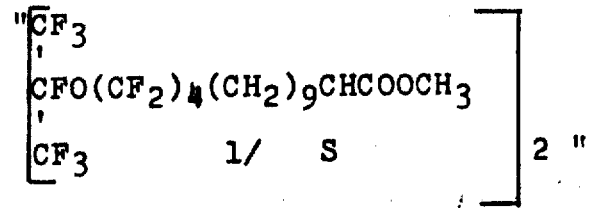

should read

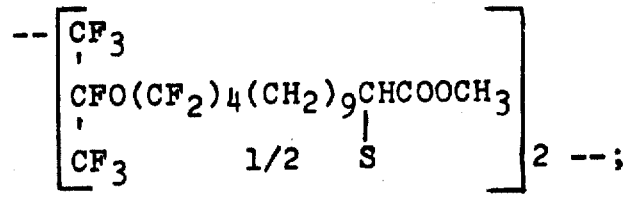

Col. 10, Example 13, 1st formula (2nd part) –

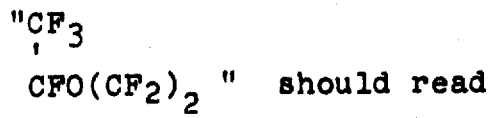 should read

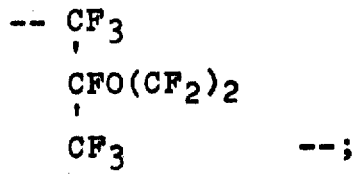

Col. 12, line 60 – "fluorotraating" should read
-- fluorotreating --;

Signed and sealed this 7th day of January 1975.

(SEAL)
Attest:

McCOY M. GIBSON JR.
Attesting Officer

C. MARSHALL DANN
Commissioner of Patents